United States Patent [19]
Corbett et al.

[11] 3,752,631
[45] Aug. 14, 1973

[54] FOAM SCRAP RECOVERY AND APPARATUS

[75] Inventors: John M. Corbett; James L. Fookes, both of Midland, Mich.

[73] Assignee: The Dow Chemical Company, Midland, Mich.

[22] Filed: Mar. 22, 1971

[21] Appl. No.: 126,486

[52] U.S. Cl........ 425/324, 425/DIG. 46, 425/174.4, 425/384, 425/456
[51] Int. Cl.............................................. B29b 1/00
[58] Field of Search.................... 425/363, 324, 328, 425/384, 456, DIG. 46, 202, 432, 174.4, 212, 165; 264/69, 144

[56] References Cited
UNITED STATES PATENTS

| | | | |
|---|---|---|---|
| 2,838,801 | 6/1958 | Long et al. | 264/37 |
| 3,344,212 | 9/1967 | Francis | 425/DIG. 46 |
| 3,000,055 | 9/1961 | Schlicksupp | 425/DIG. 46 |
| 3,422,172 | 1/1969 | Dekker | 425/363 X |

Primary Examiner—Robert L. Spicer, Jr.
Attorney—Richard G. Waterman et al.

[57] ABSTRACT

Thermoplastic foam scrap is recovered as extrudable granules by grinding the scrap, passing it over a vibrating cooled trough, applying radiant heat to the scrap, cooling and grinding to provide an extrudable pellet or particle.

5 Claims, 2 Drawing Figures

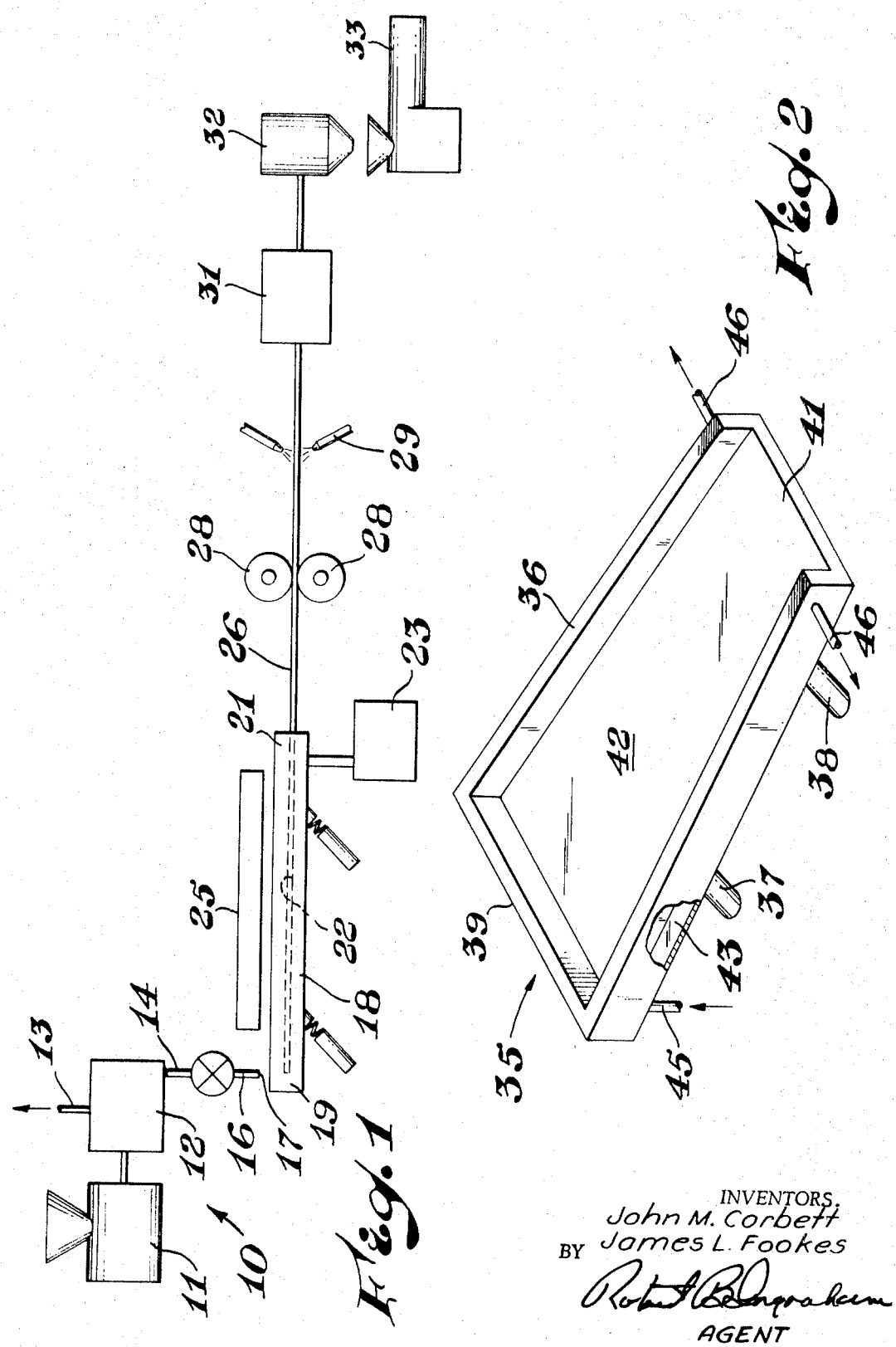

3,752,631

FOAM SCRAP RECOVERY AND APPARATUS

RELATED U.S. APPLICATION

This application is a divisional application of our copending Application Ser. No. 834,677, filed June 19, 1969, now U.S. Pat. No. 3,607,999.

A substantial problem in the preparation of thermoplastic synthetic resinous foams is recovery and/or disposal of material which does not meet production specifications and for which no reasonable market can be found. Various methods of densifying or compressing the scrap and reprocessing it into a form where it can be utilized have been proposed. The thermoplastic foam scrap is generally a material which is very low in density and is awkward to handle. Some foam recovery methods are known, including processing foam, passing it through a devolatilizing extruder and subsequently pelleting the product.

It would be desirable if there were available an improved apparatus for the recovery of polymer from thermoplastic resinous foam scrap.

It would also be desirable if there were a relatively simple apparatus for the recovery of polymer from synthetic resinous thermoplastic foam scrap.

It would further be desirable if such apparatus did not require an extrusion step.

These benefits and other advantages in accordance with the present invention are achieved in an apparatus for the densification of synthetic resinous thermoplastic foam scrap, the apparatus comprising in cooperative combination means to supply a particulate foamed synthetic resinous material, a vibrating conveyor, the conveyor having an upwardly facing conveying surface, a radiant heat supply disposed adjacent said conveying surface and adapted to supply sufficient radiant heat to cause at least partial collapse and coalescence of thermoplastic resinous foam particles disposed thereon, the conveying means having an inlet end and a discharge end, the means to supply being disposed adjacent the inlet end, cooling means disposed adjacent the outlet end adapted to cool thermoplastic resinous material discharged from the discharge end, cooling means in operative association with the vibrating conveyor and adapted to maintain the conveying surface at a temperature below which significant sticking of the thermoplastic material does not occur.

Further features and advantages of the present invention will become more apparent from the following specification taken in connection with the drawing wherein:

FIG. 1 is a schematic representation of one embodiment of the invention.

FIG. 2 is a schematic representation of a vibrating conveyor particularly suited for the practice of the present invention.

In FIG. 1 there is depicted schematically a representation of an apparatus generally in accordance with the invention designated by the reference numeral 10. The apparatus 10 comprises in cooperative combination a feed grinder or comminuting means 11 adapted to receive synthetic resinous thermoplastic foam scrap and grind it to a desired size. Beneficially, a hammer mill is found eminently satisfactory as are other well known grinding means. The comminuting device 11 is in operative combination with a storage bin or source of particulate synthetic resinous material 12. The source 12 receives comminuted material from the grinder 11 generally by pneumatic conveying where an excess of gas and dust is vented through a vent 13. The source 12 has a discharge means 14 which beneficially is a star valve which, on rotation, delivers desired predetermined quantities of particulate synthetic resinous thermoplastic foam to a discharge conduit 16 having a discharge end 17 disposed adjacent a vibrating conveyor 18. The vibrating conveyor 18 has a first or inlet end 19 and a second or discharge end 21. The conveyor 18 has an upwardly facing conveying surface 22 adapted to receive particulate foam from the discharge 17 of the conduit 16 and transport the material from the inlet end 19 to the discharge end 21 of the conveyor 18. The conveyor 18 is in operative communication with a cooling means 23 such as a source of water or forced air. A radiant heater 25 is disposed in facing adjacent relationship to the upwardly facing surface 22 of the conveyor 18 and supplies sufficient heat thereto to cause the synthetic resinous particles to at least partially collapse and coalesce to thereby form a sintered foam 26. Beneficially, the sintered foam 26 passes between a pair of pressure rolls 28 which receive the material 26 while still in heat plastified form and further densify the material 26. A resin cooling means 29, which beneficially may be opposed air nozzles which receive air under pressure, cool the densified resin which is passed to a comminuting device 31, such as a hammer mill, impact grinder or the like, which breaks the densified sheet into particles of desired size and discharges them to a hopper 32 from which they may be beneficially passed to a heat fabricating machine 33 such as an extruder.

In FIG. 2 there is schematically depicted a view of a vibrating conveyor generally designated by the reference numeral 35 eminently suited for the practice of the present invention. The conveyor 35 comprises a jacketed conveying trough 36 in operative association with vibrating means 37 and 38 operatively coupled to the jacketed trough 36. The trough 36 has a first or intake end 39 and a second or discharge end 41. Vibration of the trough is generally in a direction along the axis of vibrating means 37 and 38 which advantageously may be of a pneumatic or electrical nature. The trough 36 has a conveying surface 42 adapted to receive synthetic resinous particles. The trough 36 defines an internal space 43 generally coextensive with the surface 42 through which a cooling fluid may be pased such as water or air. A cooling fluid inlet 45 is disposed adjacent the inlet end 39 and a cooling fluid discharge means 46 is disposed adjacent the discharge end 41. Beneficially, the conveying surface 42 is substantially wider at the intake end than at the discharge end.

Generally, for most synthetic resinous thermoplastic foams or other low bulk density particles which are to be densified, the ratio of the width of the intake end of the trough or surface to the discharge end should be from about 1.5:5, depending on the particular nature of the product, and beneficially, from about 1.75 to about 2.5. Generally, the lower the bulk density of the material being densified, the higher the ratio that is desirable. Generally, a ratio of about 2:1 is eminently satisfactory where the density of the material being treated increases by a factor of about 20. The surface of the trough beneficially is polished metal such as steel, aluminum, stainless steel and the like. Sticking of the material in any significant amounts to the conveying surface can be controlled by temperature of the radiant heaters or the distance between the radiant heaters and the trough. Various mold release agents and the like are not of particular benefit if the apparatus is employed for the continous densification of a synthetic resinous material, as frequent applications of the release agent are relatively impractical. Satisfactory operation is readily obtained with a constant feed and constant temperature. The process requires little or no attention. Minor sticking of the resinous material may occur; however, the material is generally rapidly dislodged by the vibrating action of the conveyor and the densified material flowing thereover.

The following examples illustrate the manner in which the principles of the invention are applied but are not to be construed as limiting the scope of the invention.

EXAMPLE I

Employing a water-jacketed tapered tray 10 feet in length, 14 inches in width at the inlet end and symmetrically tapering to 8 inches in width at the discharge end and having sides 2¾ inches high (inside dimensions), the tray is supported on a vibrator adapted to impart 3 cycle per second vibration to the tray and forward material from the intake or wide end to the discharge or narrow end. A bank of quartz tube infrared heaters are disposed opposite the conveying surface of the tray. A polystyrene foam having a flame retardant agent and dye therein is ground to provide a particulate foam scrap having irregular particles in the range of 0.03 inch to 0.75 inch and a bulk density of 2.14 pounds per cubic foot. The polymer of the foam has a solution viscosity of 9.11 centipoise (viscosity of a 10 percent solution in toluene at 25°C.) The particulate scrap is continuously fed to the vibrating tray at an average rate of about 133 pounds per hour. The infrared heaters are adjusted to a power input of 12.2 kilovolt amperes. The polystyrene foam on the tray appears to collapse and form generally cohering masses which have the appearance of a lacy web which is passed to a pair of cooled compression rolls having a temperature of about 38° C. The polystyrene discharge from the compression rolls is in the form of a sheet and is subjected to a blast of room temperature air, passed to a grinder and discharged as a pelleted densified polystyrene which has a bulk density of 30.7 pounds per cubic foot and a solution viscosity of 8.91 centipoise. The foregoing process is operated for 6 hours without requiring attention. Prime extrusion grade polystyrene in the form of generally cylindrical pellets generally has a bulk density of about 36 pounds per cubic foot.

EXAMPLE II

The procedure of Example I is repeated with the exception that the average feed rate of 6 hours continuous operation is 194 pounds per hour and is varied between 160 and 200 pounds per hour. A representative sample of the product has a bulk density of 28.7 pounds per cubic foot and a solution viscosity of 8.71 centipoise.

EXAMPLE III

Example I is repeated with the exception that the average feed rate is 163 pounds per hour and a total of 3,432 pounds of scrap is continuously densified over a period of 21 hours. A representative sample indicates a bulk density of 27.2 pounds per cubic foot and a solution viscosity of 8.89 centipoise.

EXAMPLE IV

Nine hundred pounds of particulate polystyrene foam containing a green pigment and no fire retardant agent is treated in the manner described in Example I. The densified foam has a solution viscosity of 11.6 centipoise and a bulk density of 31.3 pounds per cubic foot. The densified material is blended with a granular extrusion grade polystyrene in a quantity sufficient that the densified scrap is 23 weight percent of the total amount and the blend is subsequently extruded to form a polystyrene foam having a density of 1.57 pounds per cubic foot and a solution viscosity of 11.6 centipoise. For purposes of comparison, the same type of foam is produced employing 23 percent reclaimed foam which is reclaimed in the manner set forth in U.S. Pat No. 2,838,801. A foam is obtained having a density of 1.57 pounds per cubic foot and a solution viscosity of 11 centipoise, indicating substantial degradation of polymer obtained by the re-extrusion process of the patent.

EXAMPLE V

A polystyrene foam containing a fire retardant agent is ground to produce particulate scrap having a bulk density of about 3.6 pounds per cubic foot and a solution viscosity of about 9.36 centipoise. A portion of the scrap is densified in accordance with Example I and a product is obtained having a bulk density of 30.8 pounds per cubic foot and a solution viscosity of 8.70 centipoise. A remaining portion of the ground scrap is densified employing an extruder in accordance with U.S. Pat. No. 2,838,801 to give a product with a bulk density of 37 pounds per cubic foot and a solution viscosity of 8.1 centipoise.

EXAMPLE VI

A cellular plastic foam of a copolymer of about 94.5 percent styrene and about 5.5 percent butadiene is ground to produce a foam scrap with a bulk density of about 1.49 pounds per cubic foot and a solution viscosity of 10.9 centipoise. Employing the procedure of Example I and a feed rate of 141 pounds per hour, the granular product obtained has a bulk density of about 30 pounds per cubic foot and a solution viscosity of about 10.7 centipoise.

EXAMPLE VII

Employing the procedure of Example I, a ground polyethylene foam scrap is densified. Physical properties ate not obtained. It is noted that greater heat input per pound is required than with polystyrene.

EXAMPLE VIII

A plastic foam of poly-o-chlorostyrene having a solution viscosity of 5.3 centipoise (the viscosity of a 10 weight percent solution in methyl ethyl ketone at 25°C.) has a bulk density of about 3.27 pounds per cubic foot. Employing the conditions of Example I, a granular product is obtained having a bulk density of 26.5 pounds per foot and a solution viscosity of 4.8 centipoise.

EXAMPLE IX

A polymer of 75 weight percent styrene and about 25 weight percent acrylonitrile having a solution viscosity of 13.2 percent (10 percent solution in methyl ethyl ketone) is passed to a foam producing extruder where it is heat plastified and admixed with a volatile blowing agent. The resultant foam is subsequently ground to produce a particulate scrap which has a bulk density of 3.27 pounds per cubic foot and a solution viscosity of 10.1 centipoise. The foam scrap is subsequently processed as in Example I to provide a granular product having a bulk density of 14 pounds per cubic foot and a solution viscosity of 9.55 centipoise (10 percent solution in methyl ethyl ketone).

EXAMPLE X

In a manner similar to Example IX, a foam is prepared from a copolymer of 75 percent styrene and 25 percent maleic anhydride. The polymer has a viscosity of 4.4 centipoise (10 percent solution in methyl ethyl ketone). The extruded foam is ground to produce a scrap having a particle size of about 0.03 inch to about 0.8 inch, a bulk density of 2.18 pounds per cubic foot and a solution viscosity of 4.10 centipoise. The resultant ground scrap is processed as set forth in Example I to provide a granular product having a bulk density of about 23.7 pounds per cubic foot and a solution viscosity of 3.9 centipoise (10 percent solution in methyl ethyl ketone).

In a manner similar to the foregoing examples, other thermoplastic resinous foams are readily densified to extrudable pellets employing the apparatus of the present invention. Such polymer foams include those prepared from vinyl chloride, copolymers of vinyl and vinylidene chloride, polyethylene, polypropylene, chlorinated polyethylene, chlorinated polypropylene, resinous copolymers of ethylene and propylene, nylon 6, nylon 66, polymethylmethacrylate and the like. Indentification of thermoplastic resinous polymers which are suitable for the practice of the present invention is readily made by exposing a portion of a polymer foam such as a ground particle to radiant heat in a quantity sufficient to cause the foam particle to at least partially collapse without visible decomposition. If, on exposure to radiant heat, such collapse is not evident or obvious decomposition occurs, the material is unsatisfactory.

As is apparent from the foregoing specification, the present invention is susceptible of being embodied with various alterations and modifications which may differ particularly from those that have been described in the preceding specification and description.

What is claimed is:

1. An apparatus for the densification of synthetic resinous thermoplastic foam scrap, the apparatus comprising in cooperative combination means to supply a particulate foamed synthetic resinous material, a vibrating conveyor, the conveyor having an upwardly facing conveying surface, a radiant heat supply disposed adjacent the said conveying surface and the radiant heat supply adapted to supply sufficient heat to cause at least partial collapse and coalescence of the thermoplastic resinous material disposed thereon, the conveying means having an inlet end and a discharge end, the means to supply being disposed adjacent the inlet end, cooling means disposed adjacent the outlet end and adapted to cool the thermoplastic resinous material discharged from the discharge end, cooling means in operative association with the vibrating conveyor and adapted to maintain the conveying surface at a temperature below which significant sticking of the thermoplastic material does not occur.

2. The apparatus of Claim 1 including pressure means at the discharge end of the conveyor adapted to compact material discharged therefrom.

3. The apparatus of claim 1 including means to comminute the material discharged from the discharge end.

4. The apparatus of claim 1 wherein the cooling means is a water jacket.

5. The apparatus of claim 1 wherein the conveying surface narrows from the inlet end to the discharge end.

* * * * *